Figure 1:
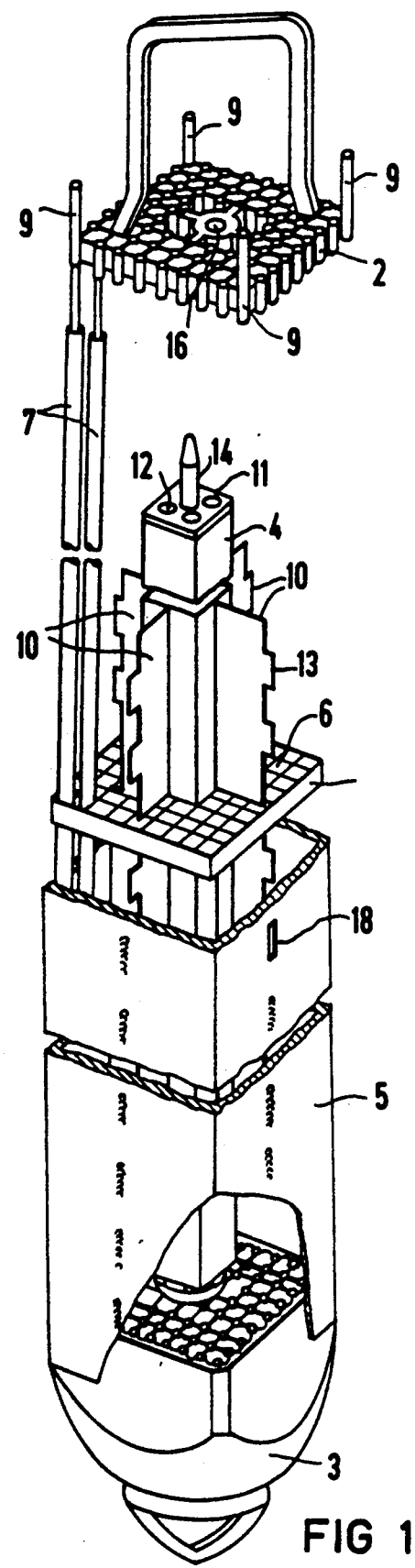

United States Patent [19]

Lettau et al.

[11] Patent Number: 5,002,725
[45] Date of Patent: Mar. 26, 1991

[54] NUCLEAR REACTOR FUEL ASSEMBLY

[75] Inventors: Hans Lettau, Effeltrich; Günther Lill, Herzogenaurach; Hans-Joachim Lippert, Hoeschstadt/Aisch; Roland Rink, Koenigshofen, all of Fed. Rep. of Germany

[73] Assignee: Siemens Aktiengesellschaft, Munich, Fed. Rep. of Germany

[21] Appl. No.: 549,634

[22] Filed: Jul. 6, 1990

Related U.S. Application Data

[63] Continuation of Ser. No. 241,858, Sep. 8, 1988, abandoned.

[30] Foreign Application Priority Data

Sep. 10, 1987 [DE] Fed. Rep. of Germany ....... 3730460

[51] Int. Cl.⁵ ................................................. G21C 3/32
[52] U.S. Cl. .................................... 376/444; 376/439
[58] Field of Search ................ 376/438, 439, 443, 444

[56] References Cited

U.S. PATENT DOCUMENTS

| | | | |
|---|---|---|---|
| 3,808,098 | 4/1974 | Fredin | 376/444 |
| 4,478,786 | 10/1984 | Andersson | 376/444 |
| 4,626,405 | 12/1986 | Field et al. | 376/448 |
| 4,652,426 | 3/1987 | Boyle | 376/444 |
| 4,781,885 | 11/1988 | Lill | 376/444 |
| 4,795,608 | 1/1989 | Nylund | 376/444 |

FOREIGN PATENT DOCUMENTS

| | | |
|---|---|---|
| 0036142 | 9/1981 | European Pat. Off. |
| 0099322 | 1/1984 | European Pat. Off. |
| 0224728 | 6/1987 | European Pat. Off. |
| 0243917 | 11/1987 | European Pat. Off. |
| 942323 | 11/1963 | United Kingdom |

*Primary Examiner*—Donald P. Walsh
*Attorney, Agent, or Firm*—Herbert L. Lerner; Laurence A. Greenberg

[57] ABSTRACT

A nuclear reactor fuel assembly includes an elongated fuel channel having opposite channel sides. Fuel rods containing nuclear fuel are mutually spaced apart in the fuel channel and parallel to the longitudinal direction of the fuel channel. A water tube inside the fuel channel has an outer surface and is parallel to the fuel rods. The water tube has a lower end with an inlet opening and an upper end with an outlet opening for liquid water. A longitudinal rib inside the fuel channel is secured to and interconnects two of the opposite channel sides and is spaced apart from the others of the channel sides. The longitudinal rib is longitudinally divided into two partial ribs each being secured to the outer surface of the water tube.

5 Claims, 1 Drawing Sheet

NUCLEAR REACTOR FUEL ASSEMBLY

This application is a continuation, of application Ser. No. 241,858, filed Sept. 8, 1988, now abandoned.

The invention relates to a nuclear reactor fuel assembly having an elongated fuel channel, fuel rods containing nuclear fuel which are mutually spaced apart in the fuel channel and are parallel to the longitudinal direction of the fuel channel, and a water tube parallel to the fuel rods and located inside the fuel channel, the water tube having an inlet opening at a lower end and an outlet opening at an upper end thereof for liquid water.

A nuclear reactor fuel assembly of this type is known from European Patent Application No. 0 224 728, corresponding to allowed U.S. application Ser. No. 926,970, filed Nov. 4, 1986. This known fuel assembly is intended for a boiling water reactor. The fuel channel thereof has a rectangular or square cross section and carries a flow of coolant in the boiling water reactor along the fuel rods of the fuel assembly. In the boiling water reactor, the outer surface of the fuel channel has control rods which have a cross-shaped cross section and each of which is located in a respective space between the fuel channels of four nuclear reactor fuel assemblies, which are disposed in the corners of a rectangular or square hole of a core lattice in the boiling water reactor.

During operation steam is produced inside the fuel channel in the boiling water reactor, so that the pressure inside the fuel channel can considerably exceed the pressure on the outside of the fuel channel. If a fuel channel, which is typically formed of a zirconium alloy, has overly thin walls, this pressure causes it to bulge outward elastically and plastically, which hinders accessibility to the control rod. Fuel assembly channels are therefore conventionally provided with a wall thickness of 2 to 3 mm.

It is accordingly an object of the invention to provide a nuclear reactor fuel assembly, which overcomes the hereinafore-mentioned disadvantages of the heretofore-known devices of this general type and which makes it possible to provide lesser wall thicknesses for the fuel channel, without having to accept an excessively great elastic or plastic bulging of the channel during operation in the boiling water reactor.

With the foregoing and other objects in view there is provided, in accordance with the invention, a nuclear reactor fuel assembly, comprising an elongated fuel channel having opposite channel sides, fuel rods containing nuclear fuel being mutually spaced apart in the fuel channel and parallel to the longitudinal direction of the fuel channel, a water tube inside the fuel channel having an outer surface and being parallel to the fuel rods, the water tube having a lower end with an inlet opening and an upper end with an outlet opening for liquid water, and a longitudinal rib inside the fuel channel being secured to and interconnecting two of the opposite channel sides and being spaced apart from the others of the channel sides, the longitudinal rib being longitudinally divided into two partial ribs each being secured to the outer surface of the water tube.

Thus the longitudinal rib is spaced apart from other sides of the channel, which are located between the two sides of the channel on which the longitudinal rib is secured. The two sides of the channel located opposite one another are therefore held together by the longitudinal rib, so that the bulging of the fuel channel remains within bounds even if its wall thickness is less than 2 mm, for example. As a result of the reduced wall thickness, an enlarged flow cross section for the coolant in the fuel channel is attained, which provides an improvement in the cooling of the fuel rods and/or an increase in the cross section of the column of nuclear fuel in the rods of the fuel assembly, and thus makes the fuel circulation more economical. Moreover, fuel channels of reduced wall thickness absorb thermal fission neutrons to a reduced extent in the boiling water reactor, and hence improve its reactivity.

In accordance with another feature of the invention, the water tube has a circular cross section.

In accordance with a further feature of the invention, the fuel channel and the water tube each have a rectangular cross section with sides of the cross section of the water tube being parallel to adjacent respective sides of the cross section of the fuel channel, the water tube has opposite sides, and the partial ribs are secured to two of the opposite sides of the water tube.

In accordance with a concomitant feature of the invention, the fuel channel and the water tube each have a square cross section.

These constructions provide particular mechanical stability.

Although British Patent No. 942,323 discloses a nuclear reactor fuel assembly having a square fuel channel in which a row of intersecting ribs is disposed and the ribs are each secured to opposite sides of the channel, this fuel assembly is intended for a nuclear reactor in which an organic fluid is used as a coolant and moderator in the core, rather than steam. The known nuclear reactor fuel assembly also has no water tube. The ribs serve merely to retain fuel rods or lattice-like spacers in the fuel channel, but they do not need to counteract bulging of the fuel channel.

European Patent Application No. 0 099 322 discloses sheet-metal ribs bent at an angle in the square channel of a nuclear reactor fuel assembly. However, these sheet-metal ribs are secured on adjacent sides, not on opposite sides of the fuel channel. Therefore, although the sheet-metal ribs do form a water conduit having a cross-shaped cross section in the fuel channel, they do not counteract bulging of the fuel channel.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
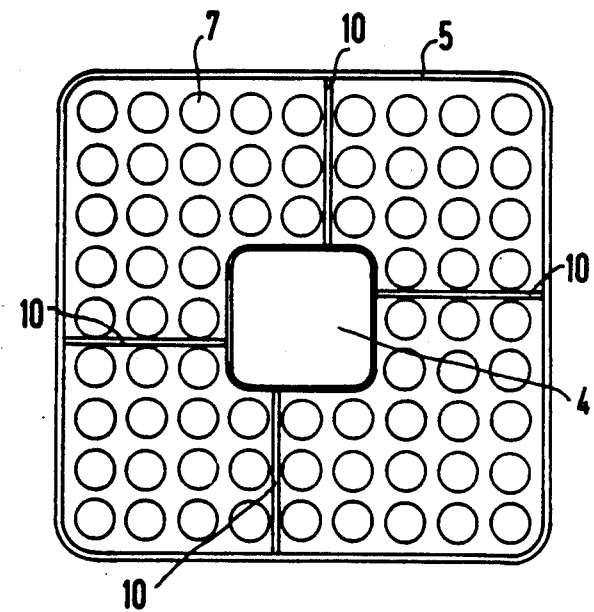
Figure 3:
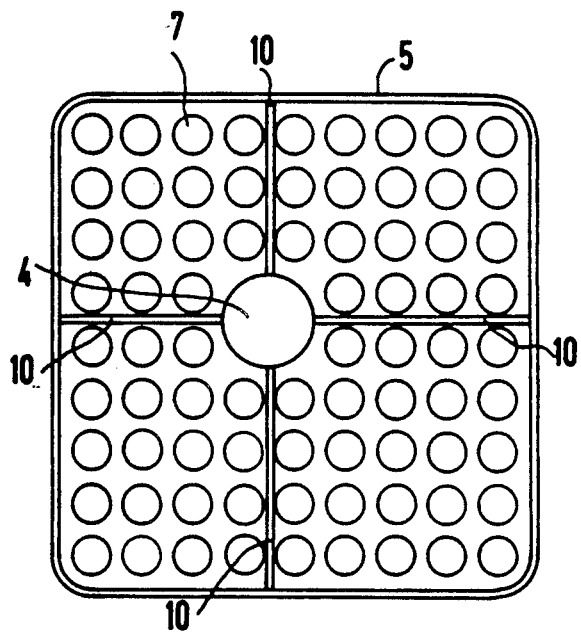

FIG. 1 is diagrammatic, partly broken-away and partly exploded perspective view of the skeleton of a nuclear reactor fuel assembly according to the invention; and FIGS. 2 and 3 are cross-sectional views of different embodiments of the fuel assembly according to the invention.

Referring now to the figures of the drawing in detail and first, particularly, to FIG. 1 thereof, there is seen a nuclear reactor fuel assembly which has a fuel assembly head or top fitting 2 and a fuel assembly foot 3, each having a rectangular or in this case a square cross section, an elongated water tube 4 having a rectangular and in this case square cross section, as well as an elongated fuel channel 5, again having a rectangular and in this a case square cross section. The water tube 4 is disposed centrally in lattice-like spacers 6, which are located inside the fuel channel 5 and are spaced apart from one another in the longitudinal direction of the water tube 4. Extending through and engaging each hole or mesh opening of this spacer 6 is a respective fuel rod 7 containing nuclear fuel. Perhaps eight of these fuel rods 7 are so-called supporting rods, which have threaded bolts on both ends with which they are screwed to the fuel assembly head 2 with a non-illustrated nut and with which they are screwed directly to the fuel assembly foot 3. The other fuel rods 7 have pins located on both ends which pass loosely through ducts in the fuel assembly head 2 and foot 3. All the fuel rods 7 are fixed with separate, helical, non-illustrated springs that are biased for compression. These springs are seated on the threaded bolt or pin on the inner surface of the fuel assembly head 2 and are supported on this inner surface and on the associated fuel rod 7.

While the fuel assembly head 2 and foot 3 are formed of stainless steel, the elongated fuel channel 5 is manufactured from a zirconium alloy. The fuel channel 5 is open at both ends and has one end fitted over the fuel assembly head 2 and the other end fitted over the fuel assembly foot 3. In other words, the fuel channel 5 encompasses the fuel assembly head 2 and the fuel assembly foot 3. The upper end of the fuel channel 5 has non-illustrated sheet-metal strips on the inside of the corners, which are firmly screwed at the upper end of stay bolts 9 to the top of the fuel assembly head 2.

The water tube 4 having a rectangular or square cross section is likewise made from a zirconium alloy. Each of the sides of the cross section of the water tube are parallel to a respective adjacent side of the cross section of the fuel channel 5. The spacers 6 have ribs which intersect at right angles and which are each also parallel to two respective parallel sides of the cross section of the water tube 4. All of the sides of the cross section of the water tube 4 are equally spaced apart from the respective adjacent side of the cross section of the fuel channel 5.

Two partial ribs 10 made of a zirconium alloy each have one long edge which is firmly welded to a respective outer surface of the water tube 4, in such a way that oppositely disposed partial ribs are mutually parallel and are disposed on mutually parallel outer surfaces of the water tube 4. The ribs are disposed between two spacers 6 or between one spacer 6 and the fuel assembly head 2 or foot 3. The mutually parallel partial ribs 10 have surfaces which are parallel to the longitudinal axis of the water tube 4 and the other long edge of each partial rib is provided with a tongue 13, in order to form a longitudinal rib inside the fuel channel 5. The tongues 13 each extend through and engage a respective one of two longitudinal slits 18 formed in two opposite parallel sides of the fuel channel 5, which are parallel to the sides of the water tube 4 on which the partial ribs 10 are firmly welded. The partial ribs 10 are welded to the outer surface of the fuel channel 5, with the tongues 13 extending through and engaging the longitudinal slits 18. The longitudinal rib which is divided by the water tube 4 into two partial ribs 10, is spaced apart from the other two sides of the two fuel channel 5 like the partial ribs 10.

The water tube 4 is closed on each end with a plate-like terminal screen or diaphragm 11. The terminal screens 11 are likewise made of a zirconium alloy and are firmly welded to the water tube 4. Each terminal screen 11 has four flow openings 12 formed therein for liquid water, although the openings at the lower end of the water tube 4 are not visible in FIG. 1. While the outer surface of the terminal screen 11 at the upper end of the water tube 4 is provided with a pin 14 that is parallel to the longitudinal direction of the water tube 4, the outer surface of the terminal screen at the lower end of the water tube 4 has a non-illustrated threaded bolt, which is likewise parallel to the longitudinal direction of the water tube 4. While the pin 14 on the upper end of the water tube 4 at the inside of the fuel assembly head 2 extends loosely through a duct 16 in a lattice-like grate of the fuel assembly head 2, the threaded bolt on the lower end of the water tube 4 at the inside of the fuel assembly foot 3 also extends through and engages a duct of a lattice-like grate of the fuel assembly foot 3, but it is firmly screwed to the foot 3 at that location with a non-illustrated nut.

In a boiling water reactor, the fuel assembly of FIG. 1 is disposed vertically and experiences a flow of coolant in the form of $H_2O$ therethrough in the fuel channel 5. The coolant enters the fuel channel 5 through the lattice-like grate of the fuel assembly foot 3 and exits from the fuel channel 5 through the lattice-like grate of the fuel assembly head 2. Only liquid water is located inside the water tube 4, which produces an increased reactivity in the reactor core of the boiling water reactor. However, on the outside of the water tube 4 in the fuel channel 5, liquid water is only located at the lower end of the fuel assembly having the fuel assembly foot 3, while wet steam is present at the upper end having the fuel assembly head 2. Bulging of the fuel channel 5 from increased pressure inside this channel 5 is counteracted by each longitudinal rib, which is formed of two mutually parallel partial ribs 10 on the water tube 4.

As FIG. 2 shows, the mutually parallel partial ribs 10 connecting one side of the fuel channel 5 to the opposite side through the water tube 4, need not be located in the same plane. Instead, each of the two partial ribs 10 is located in a plane that is parallel to the plane of the other partial rib and is spaced apart therefrom, so that the two partial ribs 10 form a stepped longitudinal rib.

As FIG. 2 shows, two mutually parallel additional partial ribs 10 may also be provided, in such a way that each is secured to the outer surface of the water tube 4 and to the inner surface of one side of the fuel channel 5. In this way, four partial ribs 10 are provided in the fuel channel 5. Each two partial ribs 10 form a stepped longitudinal rib, and are located in planes parallel to one another, which intersect the planes of the other two partial ribs 10 at an angle of 90°.

FIG. 3 shows a water tube 4 with a circular cross section, on which four partial ribs 10 are once again secured. Each two partial ribs 10 are located in the same plane inside the fuel channel 5, and are each secured to two opposite sides of the fuel channel 5. Each two partial ribs 10 which are located in the same plane belong to the same longitudinal rib and are spaced apart by different distances from the sides of the fuel channel 5 to which they are parallel.

The water tube 4 shown in FIG. 3 may also be omitted, so that two partial ribs 10 that are located in the same plane are replaced by a one-piece longitudinal rib. The two longitudinal ribs forming an angle of 90° with one another may be spaced apart from one another, or may contact one another, as seen in the longitudinal direction of the fuel channel 5.

We claim:

1. Nuclear reactor fuel assembly, comprising an elongated fuel channel having two mutually parallel and mutually opposite channel sides, fuel rods containing nuclear fuel being mutually spaced apart in said fuel channel and parallel to the longitudinal direction of said fuel channel, a water tube inside said fuel channel having two mutually parallel and mutually opposite sides being parallel to said opposite channel sides, said water tube having an outer surface and being parallel to said fuel rods, said water tube having a lower end with an inlet opening and an upper end with an outlet opening for liquid water, and a longitudinal rib inside said fuel channel being secured to and interconnecting two of said opposite channel sides, said longitudinal rib being longitudinally divided into two partial ribs each being secured to said outer surface of said water tube at a respective one of said opposite sides of said water tube.

2. Nuclear reactor fuel assembly according to claim 1, wherein said fuel channel and said water tube each have a square cross section.

3. Nuclear reactor fuel assembly according to claim 1, wherein said partial ribs are mutually parallel and are disposed in two different mutually parallel planes.

4. Nuclear reactor fuel assembly according to claim 1, wherein said fuel channel and said water tube each have a rectangular cross section.

5. Nuclear reactor fuel assembly according to claim 1, wherein said fuel channel also has other sides, and said partial ribs are spaced apart from said other sides.

* * * * *